United States Patent

Agro et al.

[11] Patent Number: 5,383,700
[45] Date of Patent: Jan. 24, 1995

[54] POSITION DETENT FOR SUN VISOR FOR VEHICLES

[75] Inventors: Marc Agro, Saint Avold; Gerard Hilt, Henriville, both of France; Sabine Rust, Aidlingen, Germany; Christian Hornung, Maichingen, Germany; Henning Peters, Pfalzgrafenweiler, Germany; Gerhard Zweigart, Aidlingen, Germany

[73] Assignee: Gebr. Happich GmbH, Wuppertal, Germany

[21] Appl. No.: 229,445

[22] Filed: Apr. 15, 1994

[30] Foreign Application Priority Data

Apr. 17, 1993 [DE] Germany ............... 4312435

[51] Int. Cl.⁶ ............................ B60J 3/02
[52] U.S. Cl. ................. 296/97.9; 296/97.12
[58] Field of Search ........ 296/97.1, 97.9, 97.12, 296/97.13; 16/325, 334, 342

[56] References Cited

U.S. PATENT DOCUMENTS

| | | | |
|---|---|---|---|
| 2,304,223 | 12/1942 | Westrope | 296/97.9 X |
| 2,414,340 | 1/1947 | Spraragen | 296/97.9 |
| 4,734,955 | 4/1988 | Connor | 16/342 X |
| 5,052,078 | 10/1991 | Hosoi | 16/342 X |
| 5,139,303 | 8/1992 | Miller | 296/97.9 |
| 5,199,132 | 4/1993 | Gabas | 296/97.9 X |

Primary Examiner—Dean J. Kramer
Attorney, Agent, or Firm—Ostrolenk, Faber, Gerb & Soffen

[57] ABSTRACT

A vehicle sun visor having a sun-visor body with a sun-visor shaft at a corner. One end region of the shaft is seated in a bearing housing in the sun-visor body and clamped against by a spring. The end region of the sun-visor shaft has as a detent an axial region corresponding to the axial extent of the spring. The sun-visor shaft has three circumferential regions of different diameter over the axial detent region including a flat, and starting from one lengthwise edge of the flat, a circular arc region and, adjoining that, a region which is spirally decreasing in diameter toward the opposite circumferential edge of the flat.

10 Claims, 2 Drawing Sheets

POSITION DETENT FOR SUN VISOR FOR VEHICLES

BACKGROUND OF THE INVENTION

The present invention relates to a sun visor for vehicles having a sun-visor body and a sun-visor shaft at a corner of the body. The shaft has an end region which is seated in a bearing housing incorporated in the sun-visor body. There the shaft is clamped by spring means in order to hold the sun-visor body in selected positions between a position of non-use below the roof of the vehicle and a position of use in front of the windshield. Over an axial region of the shaft corresponding to that region contacted by the spring means, the sun-visor shaft has a final detent or flat which secures the sun-visor body against unintended swinging while it is in the position of non-use.

A sun visor for a vehicle generally comprises a flat, approximately rectangular sun-visor body which is fastened swingably to the body of the vehicle above the windshield. The swingable attachment is effected through a sun-visor shaft which has one end region which engages into an end of the sun-visor body and another end region which is supported in a bearing bracket which, in its turn, is fastened to the body of the vehicle. In its position of non-use, the sun-visor body rests parallel to and against the ceiling of the vehicle. It can be removed from that position by hand and can be swung in the direction toward the windshield and thus into the position of use.

In order for the sun-visor body to remain in any position into which it is swung, a spring, a spring pressure plate, or the like, arranged in a bearing housing located within the sun-visor body, acts on the sun visor shaft and restrains its rotation. For additionally securing the sun-visor body in its position of non-use, there is an end region detent in the form of a flat, which is developed on the sun-visor shaft and extends over an axial region of the sun-visor shaft and is adapted to the size of the detent spring. Upon the sun-visor body being swung out of the position of use into the position of non-use, the sun-visor body and thus also the spring means move around the relatively stationary sun-visor shaft. The transition around the shaft from the round to the flat region of the sun-visor shaft is abrupt. As a result, the movement of the visor body when the spring means drops into the flat of the sun-visor shaft is sudden. For roofs with padding, the sudden movement can be acceptable. But it is not acceptable for hard roofs, comprised of compacted materials containing, for instance, sawdust. Against roofs of hard material, the sudden movement of the sun-visor body upon the dropping of the spring into the flat of the end detent is accompanied by a loud and unpleasant contact noise, which can easily annoy the driver of the vehicle.

SUMMARY OF THE INVENTION

The object of the present invention is to create a sun visor in which loud contact noise is avoided upon the sun-visor body striking against the roof.

According to the invention, the portion of the sun-visor shaft in the bearing housing, i.e., exposed to spring force, has respective circumferential regions of different diameter over the axial region of the shaft that is provided with the flat. Starting from one longitudinal edge of the first circumferential region at the flat, the shaft is developed arcuate over a second region of the circumference. Adjoining the second region, the shaft decreases spirally in diameter toward the other longitudinal edge of the flat over a third region of the circumference.

The invention avoids sudden movement of the visor body upon the travel of the spring onto the flat of the sun-visor shaft. The possibly bothersome contact noises are thus greatly dampened. Furthermore, the tight seat of the sun-visor body in its position of non-use with the spring biased against the flat can be maintained in the customary manner.

The invention is further optimized when the third region of the circumference of the sun-visor shaft which decreases spirally in diameter passes into the first region at the flat over a smaller radius. This draws the sun-visor body softly into the final detent position.

As has been shown by investigations and experiments, it is advantageous for the third region of the circumference of the sun-visor shaft, which decreases spirally in diameter, to extend circumferentially over about 90°.

Other features and advantages of the present invention will become apparent from the following description of one embodiment of the invention which refers to the accompanying drawings.

DETAILED DESCRIPTION OF THE INVENTION

Figure 1:
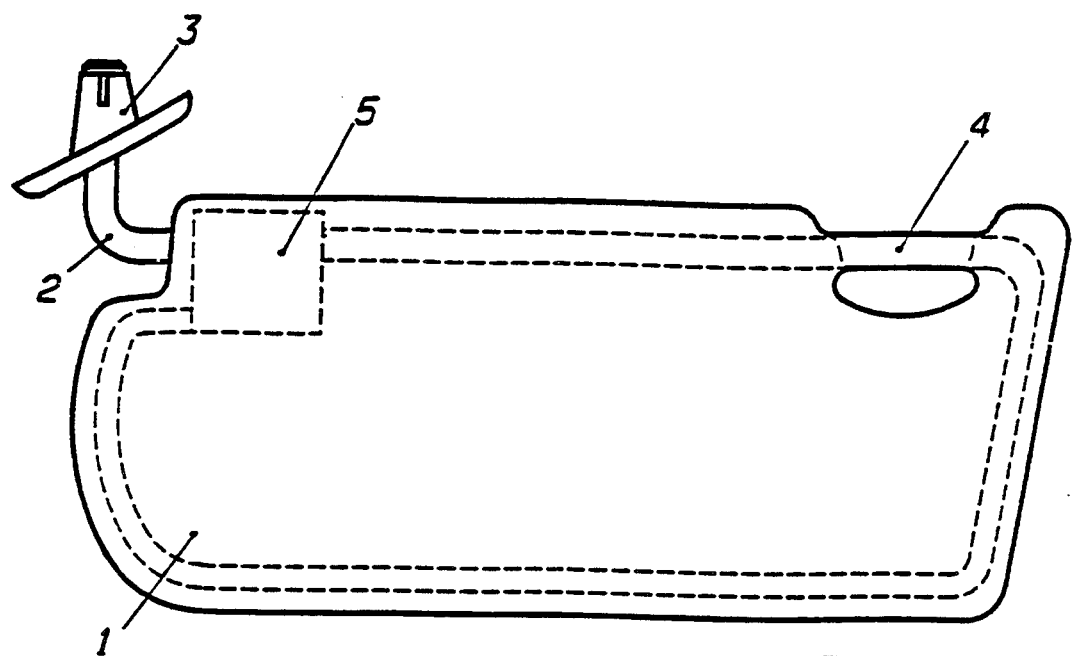
FIG. 1 is a front view of a sun visor.
Figure 2:
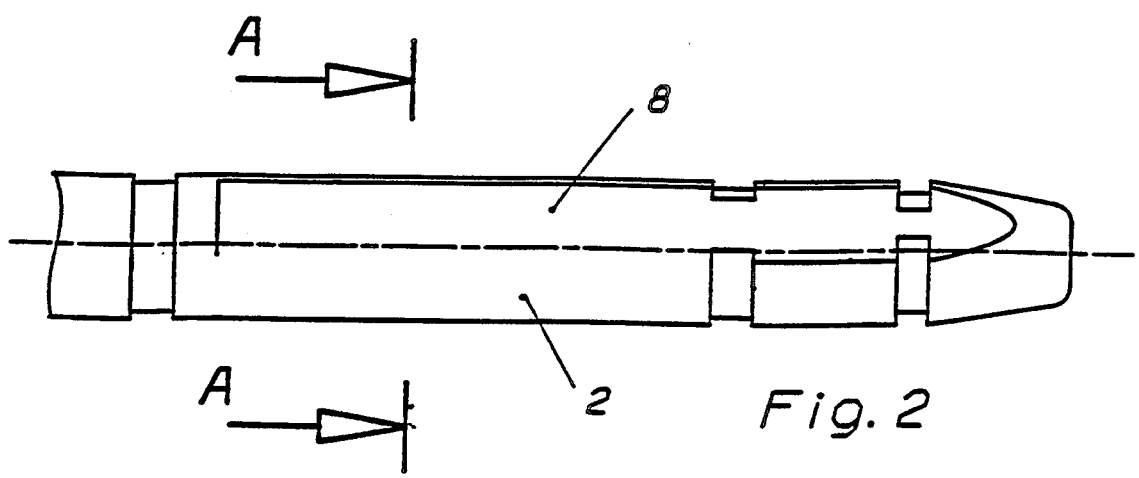
FIG. 2 shows an end region of the sun-visor shaft of the sun visor of FIG. 1.

A vehicle sun visor comprises a sun-visor body 1 in the form of a relatively flat, approximately rectangular plate and an L-shaped sun-visor shaft 2 which support the sun visor 1 at one upper corner. One end of the shaft is seated in a bearing bracket 3. At the other end at the top of the visor body, there is an outer support pin 4 which can be engaged detachably in an outer support bracket (not shown).

Within the sun-visor body 1 there is a bearing housing or cage 5 which supports a pressure plate 7 which is acted on by at least one compression spring 6 that is supported in the cage and urges the plate 7 against the shaft 2. The bearing cage 5 receives an end region of the sun-visor shaft 2. The pressure plate 7 acts on the shaft under the pressure of the spring 6.

Figure 4:
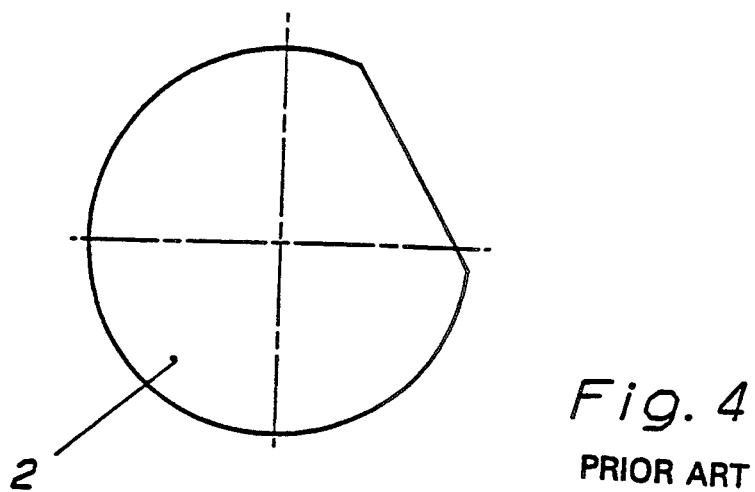
FIG. 4 is a section similar to that of FIG. 3 but through a traditional embodiment of a sun-visor shaft.

A sun-visor shaft 2 is traditionally of cylindrical development, as shown in FIG. 4, and is provided with a flat 8 over a certain axial region on which the spring or pressure plate 7 acts.

Figure 3:
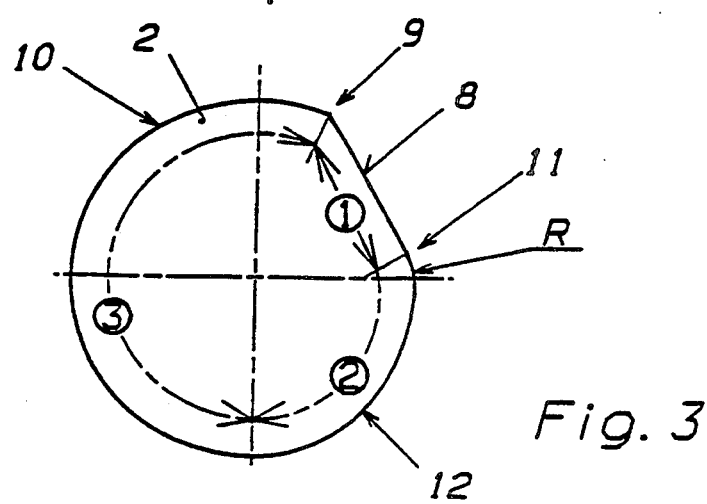
FIG. 3 is a section along the line A—A of FIG. 2.
Figure 5:
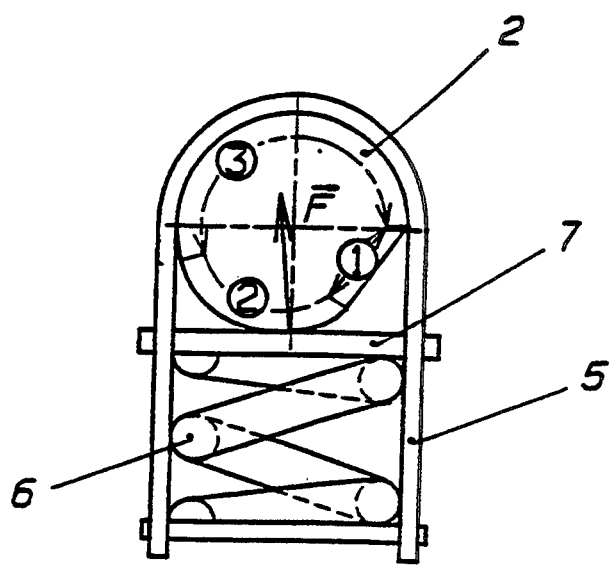
FIG. 5 shows a bearing cage with a sun-visor shaft.

In contrast, the sun-visor shaft 2 of the invention has three different circumferential zones over its axial region on which the plate 7 acts. The first zone 1 (see FIGS. 3 and 5) comprises a flat 8, while the adjacent second zone 3, starting from one longitudinal edge 9 of the flat 8, comprises a circular arc 10, and the third adjoining zone 2 comprises a spiral 12 which decreases in diameter toward the other longitudinal edge 11 of the flat 8. It is also important that the spirally decreasing region 12 of the circumference passes via a curved radius R into the flat 8 to smooth the sliding of the spring or pressure plate 7 into the end detent formed by the flat 8.

The pressing of the pressure plate 7 on the sun-visor shaft 2, which is supported by the bearing cage, is greatest when the pressure plate is in the region of the third zone of the circular arc 10. This region coincides with the position of use of the sun-visor body 1 which ordinarily enters into consideration. Upon the swinging up of the sun-visor body 1 into the position of non-use, the pressure plate 7 is rotated away from the zone 3, passes through the zone 2, and finally comes parallel to the zone 1, the flat 8. Because the sun-visor shaft 2 decreases spirally in diameter toward the flat 8, and the transition to the flat 8 is developed as a radius R, sudden movement of the visor body and the shaft is avoided. As a result, the sun-visor body also no longer strikes hard against the roof covering.

It is obvious that the pressure plate 7 is arranged adjustable in height on the bearing cage 5. It is also obvious that the bearing cage 5 can be replaced with a bearing housing and that the pressure plate 7 can be replaced with a U-shaped leaf spring, as shown, for instance, in Federal Republic of Germany Patent 25 51 633, since the significant factor here is the special development of the sun-visor shaft 2.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A sun-visor for a vehicle comprising:
   a sun-visor body;
   a sun-visor shaft projecting from and movable with the sun-visor body for being received in the body of a vehicle in which the sun-visor is supported; the sun-visor shaft having an end region in the sun-visor body; the end region having an axial detent region;
   spring means supported in the sun-visor body and sized and positioned for applying pressure against the periphery of the shaft over the axial detent region for retaining the shaft in a selected rotated position from a position of non-use of the visor body stored below the roof of the vehicle to and into a position of use of the visor body in front of a vehicle window;
   the sun-visor shaft axial detent region having respective circumferential regions around the sun-visor shaft including
      a first region which is flat and is so placed around the shaft that when the spring means is pressed against the first region, the sun-visor body is in its position of non-use and the spring means acting on the first region holds the sun-visor body in its position of non-use, the first region having opposite first and second circumferential edges;
   starting from the first circumferential edge of the first region, the sun-visor shaft having a second circumferential region developed as circular arc; and
      beyond the second region, the shaft having a third circumferential region which is developed generally as a spiral with a gradually decreasing diameter and extending toward the second circumferal edge of the first region.

2. The sun-visor of claim 1, wherein the third region is of such circumferential length that it extends to the second circumferential edge of the first region, whereby there are only the first, second and third circumferential regions around the shaft at its axial detent region.

3. The sun-visor of claim 2, wherein the third circumferential region around the sun-visor shaft, which decreases spirally in diameter, passes into the first region around a radius curve at the second circumferential edge.

4. The sun-visor of claim 3, wherein the third circumferential region of the shaft has a circumferential extent of over about 90°.

5. The sun-visor of claim 2, wherein the third circumferential region of the shaft has a circumferential extent of over about 90°.

6. The sun-visor of claim 1, further comprising a shaft bearing in the sun-visor body.

7. The sun-visor of claim 6, wherein the sun-visor body has corners and the sun-visor shaft bearing is generally at one of the corners of the sun-visor body.

8. The sun-visor of claim 1, wherein the spring means comprises a spring, a bearing housing in the visor body including a bearing for the shaft and also supporting the spring means which includes a plate supported by and normally urged by the spring means against the circumference of the shaft at the detent region.

9. The sun-visor of claim 8, wherein the spring is a compression spring.

10. The sun-visor of claim 9, wherein the bearing housing comprises a frame in the sun-visor body in which the shaft is supported for rotation and is supported against the bias of the spring, the plate is supported for movement relative to the frame and the spring is supported in the frame and against the plate for biasing the plate against the shaft.

* * * * *